No. 754,856. Patented March 15, 1904.

UNITED STATES PATENT OFFICE.

AUGUST DORRER, OF LUDWIGSHAFEN-ON-THE-RHINE, GERMANY, ASSIGNOR TO THE BADISCHE ANILIN UND SODA FABRIK, OF LUDWIGSHAFEN-ON-THE-RHINE, GERMANY, A CORPORATION OF BADEN.

RED-VIOLET AZO DYE.

SPECIFICATION forming part of Letters Patent No. 754,856, dated March 15, 1904.

Application filed December 9, 1902. Serial No. 134,564. (No specimens.)

*To all whom it may concern:*

Be it known that I, AUGUST DORRER, doctor of philosophy and chemist, a subject of the King of Würtemberg, residing at Ludwigshafen-on-the-Rhine, in the Kingdom of Bavaria, Empire of Germany, have invented new and useful Improvements in Azo Coloring-Matters, of which the following is a specification.

My present invention is based upon my discovery that certain diazo compounds of aromatic sulfo-acids can be combined with 1.8-naphthylene-diamin to form coloring-matters of technical value. The coloring-matters thus produced can be directly employed for dyeing, or they can be further treated with nitrous acid, in which case azimid bodies result. As a rule, however, the tinctorial properties of the coloring-matters are not altered by this treatment to any great extent. The property by which my new coloring-matters are distinguished from all others hitherto known is that on reduction—for instance, by means of ammonia and zinc-dust—they yield the sulfo-acid of a primary aromatic monamin and a body regarded as 1.8.4-triamido-naphthalene, which latter body can be recognized by its oxidation product.

The test can be carried out as follows: Extract with ether the liquid obtained by reducing the aqueous solution or suspension of the coloring-matter with zinc-dust and ammonia. Triamido-naphthalene dissolves in the ether. In the discolored aqueous solution the amidosulfo-acid remains and can be recognized by those skilled in the art by diazotizing it and combining it with known components. The yellowish ethereal solution of the triamido-naphthalene on being shaken with dilute hydrochloric acid yields an aqueous solution of a salt of the triamido-naphthalene, which solution on account of partial oxidation by air is generally blue-violet. Add thereto a sufficient quantity of ferric-chlorid solution to form the oxidation product, and extract the acid solution with ether. An orange-red ethereal solution results, and on evaporating off the ether the oxidation product remains in dark crusts. These dissolve in alcohol or water, yielding a fine blue-red solution, the addition to which of hydrochloric acid causes it to discharge its color, while the addition of dilute caustic-soda lye yields an orange-red solution, and an excess of concentrated caustic-soda lye yields a pale brown-yellow solution.

My new coloring-matters however obtained when dry are dark powders and are soluble in water, yielding yellow-red to red-violet solutions. In concentrated sulfuric acid they dissolve, yielding from blue to red-violet solutions. They dye animal fiber from the acid-bath violet-brown to red-violet shades, which on treatment with potassium bichromate become brown.

The specific coloring-matter from 1.4-naphthylamin-sulfo-acid and 1.8-naphthalene-diamin when dry is a dark powder which is soluble in water, yielding a red-violet solution and is also soluble in concentrated sulfuric acid, yielding a blue solution. It dyes animal fiber from the acid-bath a red-violet shade, which on treatment with potassium bichromate turns brown. On reduction by means of ammonia and zinc-dust it yields 1.4-naphthylamin-sulfo-acid and 1.8.4-triamido-naphthalene.

The diazo compounds for combining with 1.8-naphthylene-diamin according to my present invention are prepared from 1.4-naphthylamin sulfo-acid, 2.8-naphthylamin-sulfo-acid, sulfanilic acid, or metanilic acid.

The following example will serve to further illustrate the nature of my invention, which, however, is not confined to this example. The parts are by weight.

Example: Dissolve one hundred and ninety-six (196) parts of sodium naphthionate and fifty-five and one-fifth (55⅕) parts of sodium nitrite in two thousand parts (2,000) of water. Gradually run this solution into two hundred and forty-three (243) parts of hydrochloric acid containing thirty (30) per cent. of HCl and stir until the formation of the diazo compound is complete. Then run the solution into a solution of one hundred and twenty-six and one-half (126½) parts of 1.8- naphthylene-diamin base in one hundred and ninety-four (194) parts of hydrochloric acid containing thirty (30) per cent. of HCl, which has been diluted with six thousand (6,000) parts of water. Stir until the combination is complete, and then boil the solution and filter off the coloring-matter, which separates out, and press it and convert it into its sodium salt by means of a solution in water of forty-four (44) parts of anhydrous sodium carbonate. Precipitate by means of common salt the sodium salt of the coloring-matter thus formed and press and dry.

To prepare the azimid compound of the coloring-matter, rub up the acid press cake, obtained as hereinbefore described, with three thousand (3,000) parts of water. Cool the whole by the addition of ice to from zero to five degrees centigrade (0° to 5° C.) Add thereto one hundred and ninety-four (194) parts of hydrochloric acid containing thirty (30) per cent. of HCl and then an aqueous solution of fifty-five and one-quarter (55¼) parts of sodium nitrite. After stirring for, say, from six to eight (6 to 8) hours neutralize the cold solution of the coloring-matter by means of sodium carbonate and warm the whole and salt out the coloring-matter by means of common salt. In a similar manner coloring-matters can be obtained when employing the diazo compounds of the other aromatic sulfo-acids hereinbefore mentioned.

I claim—

1. As a new product the new class of azo coloring-matters which can be obtained by combining a diazo compound of an aromatic amido sulfo-acid with 1.8-naphthalene-diamin, which are soluble in water and in concentrated sulfuric acid, and which dye animal fiber from the acid-bath, which coloring-matters on reduction by means of ammonia and zinc-dust yield a sulfo-acid of a primary amin and 1.8.4-triamido-naphthalene.

2. As a new article of manufacture the azo coloring-matter which can be obtained by combining the diazo derivative of 1.4-naphthylamin-sulfo-acid with 1.8-naphthalene diamin, which coloring-matter is soluble in water, yielding a red-violet solution and is also soluble in concentrated sulfuric acid yielding a blue solution, which dyes animal fiber from the acid-bath a red-violet shade, which shade on treatment with potassium bichromate turns brown, which coloring-matter on reduction by means of ammonia and zinc-dust yields 1.4-naphthylamin-sulfo-acid and 1.8.4-triamido-naphthalene.

In testimony whereof I have hereunto set my hand in the presence of two subscribing witnesses.

AUGUST DORRER.

Witnesses:
ERNEST F. EHRHARDT,
JACOB ADRIAN.